(No Model.) 2 Sheets—Sheet 1.

B. A. LILLIE.
FRUIT STONING MACHINE.

No. 384,371. Patented June 12, 1888.

Witnesses
Geo. H. Strong
J. H. Towne

Inventor,
B. A. Lillie.
By Dewey & Co.
Atty (No Model.) 2 Sheets—Sheet 2.

B. A. LILLIE.
FRUIT STONING MACHINE.

No. 384,371. Patented June 12, 1888.

Witnesses,
Geo. H. Strong
J. H. Hurst

Inventor,
B. A. Lillie,
By Dewey & Co.
attys

UNITED STATES PATENT OFFICE.

BENJAMIN A. LILLIE, OF SAN FRANCISCO, CALIFORNIA.

FRUIT-STONING MACHINE.

SPECIFICATION forming part of Letters Patent No. 384,371, dated June 12, 1888.

Application filed March 22, 1888. Serial No. 268,139. (No model.)

*To all whom it may concern:*

Be it known that I, BENJAMIN A. LILLIE, of the city and county of San Francisco, State of California, have invented an Improvement in Fruit-Stoning Machines; and I hereby declare the following to be a full, clear, and exact description of the same.

My invention relates to the class of machines for stoning fruit, and more especially to those machines adapted for the larger and flesh-clinging fruit, such as clingstone peaches.

My invention consists in the novel cutting and gripping knives, their peculiar arrangement, and the mechanism by which they are operated, in the scrapers on which the fruit rests and their novel arrangement and operation, and in details of construction, all of which will be hereinafter fully described.

The object of my invention is to provide a simple and effective machine of this class.

Figure 1:
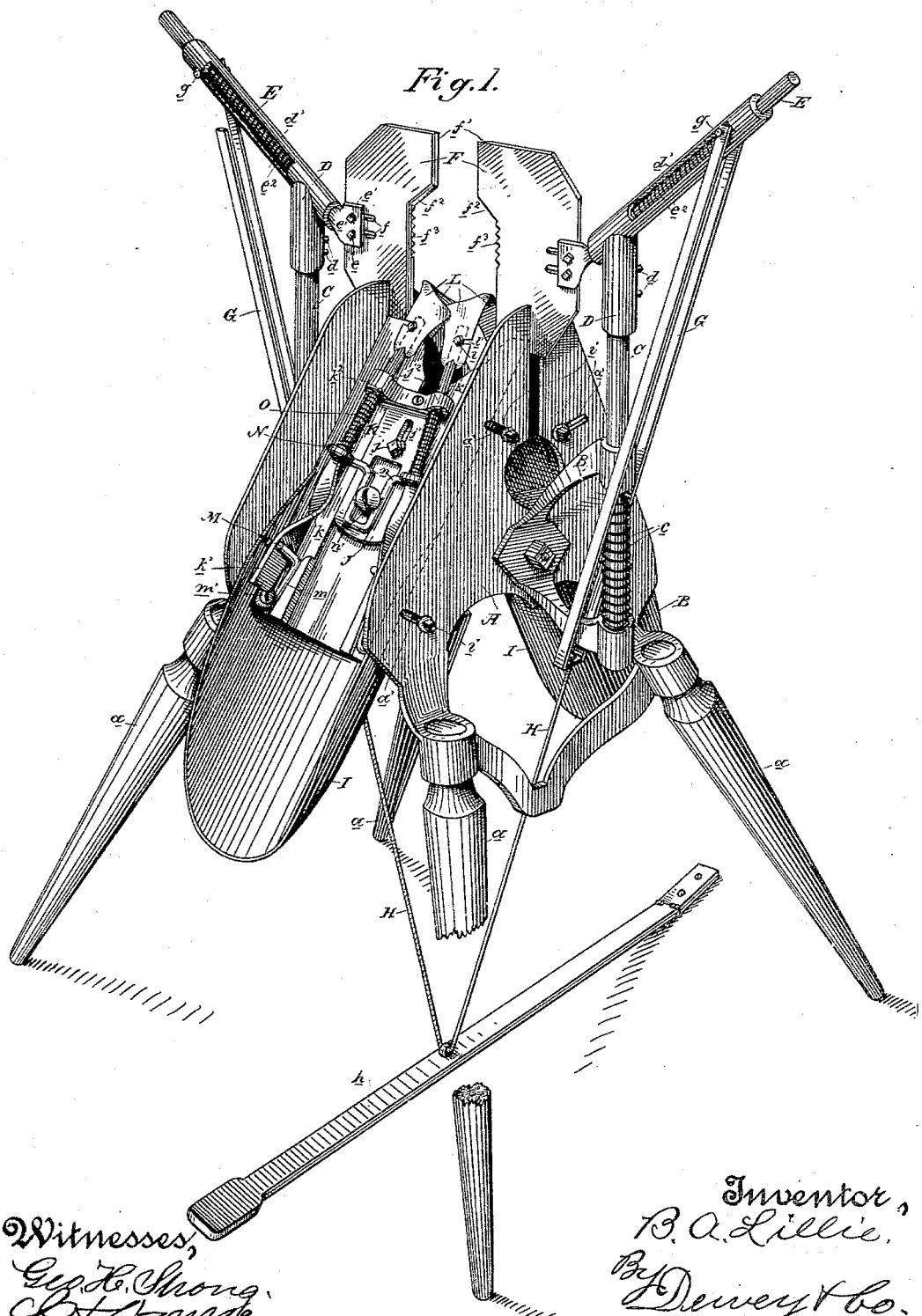
Figures 2, 3:
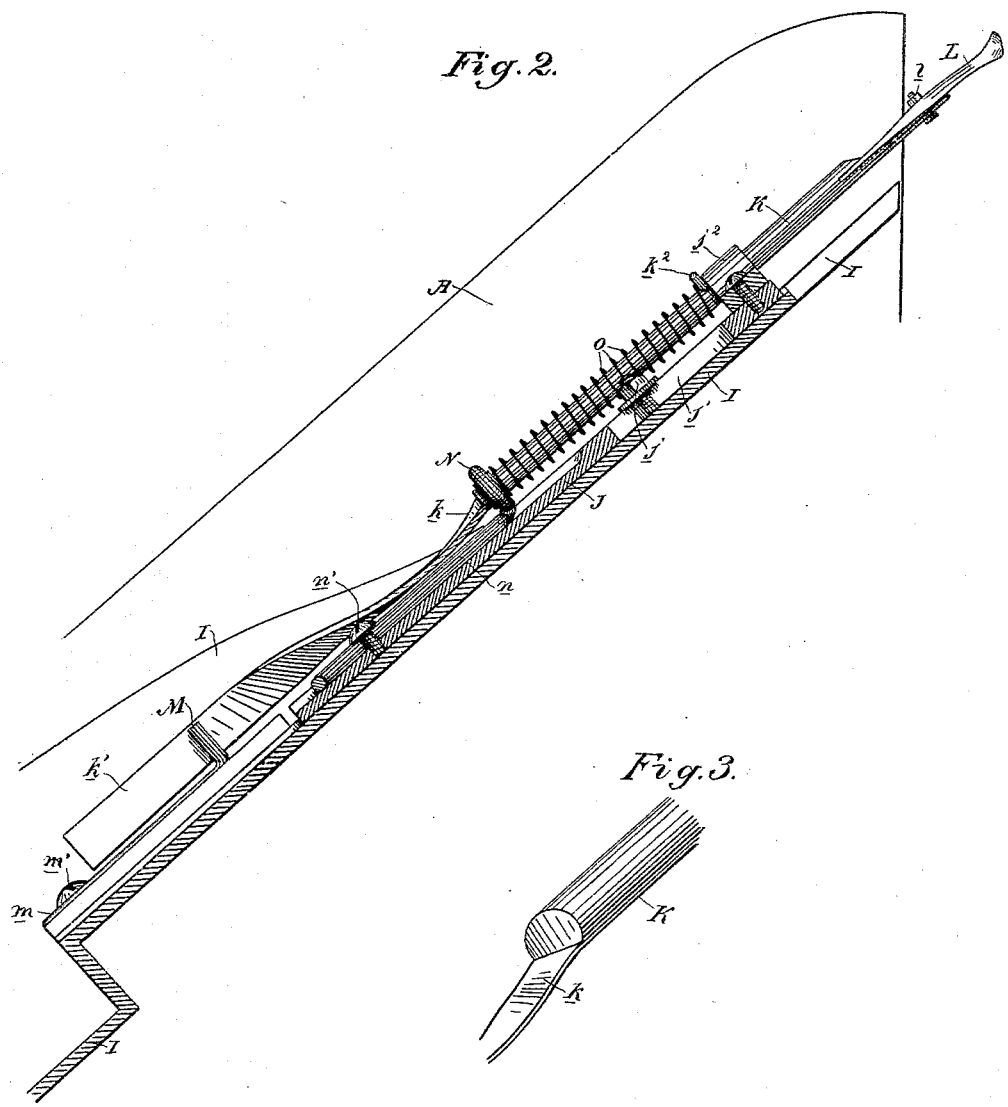

Referring to the accompanying drawings, Figure 1 is a perspective view of my fruit-stoning machine. Fig. 2 is a central vertical section through the chute I. Fig. 3 is a view showing the position of the spiral extension $k$ with relation to the stem K.

A is the frame of the machine, having the supporting-legs $a$. On each side of the frame is bolted a bracket, B, having socketed ends, through which pass the spindles C, adapted to move up and down in their seats, being returned to position by springs $c$.

D is a sleeve fitted upon the upper end of each spindle C and adapted to be set up or down thereon by set-screws $d$. These sleeves are formed with or have secured to them the inclined tubular guides or socket-bearings $d'$, in which are seated and adapted to slide the shanks or stocks E, which carry on their lower ends the cutting and gripping knives F, these being secured to the shanks by means of bolts $e$, passing through laterally-elongated slots $f$ of the knives into a small cross-head, $e'$, of the shank, this connection providing for the initial adjustment of the knives with relation to each other. Springs $e^2$, encircling the shanks E, hold the knives normally separated.

G are connecting-yokes, having their upper ends pivoted at $g$ to the shanks or stocks E, and thence passing down on each side of the spindles C and brackets B and converging to their lower ends, where they connect with a bail, H, the lower end of which is connected with a treadle, $h$. Now it will be seen that upon pressing down the treadle the first effect is, through the bail and connecting-yokes, to pull down on the shanks or sockets E, whereby the knives F are caused to approach each other, both moving in downwardly-converging planes, and the second effect, which takes place immediately after the initiation of the first and during its continuance and after its cessation, is to pull the spindle C down, whereby the knives move down in vertical planes. Upon relieving the treadle the springs $c$ $e^2$ return the parts to position.

The knives are made with cutting-edges $f'$, having opposing recessed portions $f^2$ and gripping-teeth $f^3$. The recessed portion may be made either on a concave curve, a horizontal line, or, as here shown, on an incline. The edges $f'$ above are beveled on one side only, and with relation to each other these bevels are on opposite sides, so that when the knives come together they may pass and overlap.

Between the side plates of the frame A are secured the downwardly-divergent chutes I, the upper ends of which come close up to the sides of the knives F, which, however, play down freely between them. These chutes are held to the frame by means of cross-bolts $i$, which pass through elongated slots $a'$ in the side plates of the frame, so that the inclination of the chutes may be varied. The tops of the chute are cut out in their center to provide an opening through which the pit or stones may drop.

Secured within each chute is a bracket, J, held by a bolt, $j$, passing through an elongated slot, $j'$, whereby the bracket may be primarily adjusted as to height. The upper end of the bracket has two sockets, $j^2$, made at a downwardly-divergent angle with relation to each other, and in each socket is fitted the stem K, which carries on its upper end the cutter or scraper L. There are four of these in all, a pair being on each side of the machine, and their upper edges are rounded down in such a manner that one member of each pair comes quite up to or overlaps the other member, and the four come together so as to form a kind of cup to receive the fruit in the first instance. These scrapers are fitted to their stems by means of small bolts $l$, passing through slots $l'$, so that they may be primarily adjusted with relation to each other. Their lower edges fit in grooves in the stems to afford additional security.

The lower ends of the stems K are formed with a flattened extension, $k$, made with an outward twist or spiral which terminates in straight portions $k'$. These spiral or twist extensions are fitted and guided between a pair of fixed guide lugs or pins, M, on each side, said lugs or pins being carried by slotted frames $m$, secured to the chutes I by means of screws or bolts $m'$, whereby they may be adjusted up or down.

Around the stems K are fitted loosely the collars N, which have a slotted connecting-frame, $n$, secured to the bracket J by a screw or bolt, $n'$, whereby it may be adjusted up or down. Around the stems are fitted springs O, the upper ends resting against pins $k^2$ on the stems and their lower ends resting on the collars N. These springs serve to return the scrapers after they have been pressed down, and the tension of the springs is regulated by the vertical adjustment of the collars N. Now, by pressing down on the top of the scrapers they move down with their stems, and at the same time, by reason of their spiral extensions $k$ working between the fixed guides M, they have a partial axial rotation, their inner edges turning outwardly and their outer edges inwardly, thereby through both movements expanding the space between them in order to receive the pit or stone and conforming to its surface with sufficient accuracy to thoroughly scrape or clean it.

The operation of the machine is as follows: Standing at the side of the machine, the operator places one foot on the treadle, and then places, by hand, the fruit (say, for example, a clingstone peach) down upon the tops of the cutters or scrapers L. While holding it there he presses down upon the treadle, thereby bringing the knives F down and together, so that their edges sink into the peach up to its stone, the cutting-edges $f'$ and recessed portions $f^2$ cutting down upon the top of the peach and their teeth $f^3$ firmly gripping the stone. Then, as the knives F move down vertically, they press the peach down upon the cutters or scrapers L, which cut its under portion in to the stone, and then, following the contour of the stone as it is forced down between them, they scrape and clean off from it all the clinging flesh, and, finally, when the pressure is relieved, the flesh of the fruit drops down the chutes into suitable receptacles, while the stone passes down through the center opening between the chutes. In order to perfect the operation of the scrapers, I provide for maintaining the overlapping or relative position of the edges of each pair during and notwithstanding their axial movement, which would naturally tend to separate them. I do this by the following construction: Instead of extending the spiral or twist $k$ of the stems K from their longitudinal center planes, I extend it from and in line with their under surfaces, Fig. 3. I also make the collars N, through which the stems K pass, sufficiently elongated to permit a slight side movement, and I bevel out the sockets $j^2$, so that the stems may fulcrum slightly therein. Now, by reason of the position of the twist-extension, the lower end of the stem below its fulcrum-socket is moved outwardly as it turns axially, thereby throwing its portion above the socket and the scraper on its top inwardly. This slight movement is sufficient to keep the edges together while partially rotating outwardly, so that all the stone is kept covered.

In handling freestone fruit, where the scraping function of the scrapers is not so essential, their axial motion may be dispensed with by moving the pins or lugs M down, so that the straight portion $k'$ of the spiral extension $k$ shall play between them. The scrapers will then simply yield vertically; but as they move down in inclined planes they open up between them for the proper passage of the stone.

By reason of the adjustment of the chutes I by the bolts $i$ in the slots $a'$ the inclination of the scrapers L may be varied to bring their tops into more or less intimate relation.

The cutters or scrapers L as herein constructed and operating may be used in connection with other forms of cutting and gripping knives above, as well as with the knives F.

Having thus described my invention, what I claim as new, and desire to secure by Letters Patent, is—

1. In a fruit-stoning machine, opposing knives for cutting the fruit and gripping its pit, and having sliding shanks whereby the knives may move together to close on the pit, in combination with vertically-movable spindles carrying the shanks of the knives, whereby the latter may be driven down after gripping the pit, substantially as herein described.

2. In a fruit-stoning machine, opposing knives for cutting the fruit and gripping its pit, and sliding shanks for said knives mounted at a downwardly-converging inclination with relation to each other, whereby the knives may move together and downwardly to close on the pit, in combination with vertically-movable spindles carrying the shanks of the knives, whereby the latter may be drawn down after gripping the pit, substantially as herein described.

3. In a fruit-stoning machine, opposing knives for cutting the fruit and gripping its pit, and having sliding shanks whereby they may move together to close on the pit, and springs for returning them, in combination with vertically-movable spindles carrying the shanks of the knives, whereby the latter may be drawn down after gripping the pit, and springs for returning the spindles, substantially as herein described.

4. In a fruit-stoning machine, opposing knives for cutting the fruit and gripping the pit, and having sliding inclined shanks whereby they may move together to close on the pit, and springs for returning them, vertically-sliding spindles carrying the shanks, whereby the knives may be drawn down after gripping the pit, and springs for returning said spindles, in combination with the treadle, the bail connected therewith, and the yokes connected with the bail and with the shanks of the knives, whereby they are operated, substantially as herein described.

5. In a fruit-stoning machine, the vertically-moving spindles, in combination with the adjustable sleeves on their tops, the socket-bearings carried by the sleeves, and the knives having sliding shanks mounted in the socket-bearings, substantially as herein described.

6. In a fruit-stoning machine, the oppositely-moving knives F, having the cutting-edges $f'$ and the underlying opposite recessed portions $f^2$, substantially as herein described.

7. In a fruit stoning machine, the knives F, each having a movement in a downwardly-converging plane and provided with the cutting-edges $f'$, the recessed portions $f^2$, and the gripping-teeth $f^3$, substantially as herein described.

8. In a fruit stoning machine, the oppositely-moving knives F, having the opposing recessed portions in their cutting-edges, whereby the fruit is cut on the sides and top in to the pit, in combination with cutters or scrapers arranged in pairs upon each side of the machine, so as to form a cup against which the base of the fruit is forced by the knives, substantially as herein described.

9. In a fruit-stoning machine, the cutting and gripping knives having the sliding shanks, and the vertically-sliding spindles carrying the shanks, whereby the knives may be drawn together to cut the fruit and grip its pit, and may be moved down with the fruit and pit, in combination with cutters or scrapers below upon which the fruit is forced, whereby the flesh is separated from the pit, substantially as herein described.

10. In a fruit-stoning machine, the cutting and gripping knives having the inclined sliding shanks with a spring for returning them, the vertically-sliding spindles carrying the knife-shanks and having springs for returning them, and the mechanism for operating the knives, consisting of the treadle, the yokes connected with the inclined knife-shanks, and the bail conecting the treadle with the yokes, in combination with cutters or scrapers upon which the fruit is forced by the knives, whereby the flesh is separated from the pit, substantially as herein described.

11. In a fruit-stoning machine, the cutters or scrapers upon which the fruit is forced, said scrapers having sliding stems provided with spiral extensions or twists, in combination with fixed guides in which the extensions play, whereby the scrapers have imparted to them a partial rotary movement as the pit is forced between them, substantially as herein described.

12. In a fruit-stoning machine, the cutters or scrapers upon which the fruit is forced, said scrapers having sliding stems provided with spiral extensions or twists and springs for returning the stems, in combination with fixed guides in which the extensions play, whereby the scrapers have imparted to them a partial rotary movement as the pit is forced between them, substantially as herein described.

13. In a fruit-stoning machine, the cutters or scrapers upon which the fruit is forced, said scrapers having sliding stems with springs for returning them and spiral extensions or twists on their lower ends terminating in straight portions, in combination with fixed guides in which the extensions play, and movable adjustable frames carrying said guides, whereby they may be lowered to the straight terminations of the extensions or twists, substantially as herein described.

14. In a fruit-stoning machine, the cutters or scrapers having the sliding stems with spiral extensions or twists and the fixed guide pins or lugs in which said extensions play, in combination with the adjustable bracket J, having the sockets in which the stems slide, the adjustable frame with its collars N on the stems, and the springs for returning the stems, substantially as herein described.

15. In a fruit-stoning machine, the convergent cutters or scrapers upon which the fruit is forced, arranged in pairs with meeting or overlapping edges, said cutters or scrapers having sliding stems with spiral extensions or twists projecting in line with the under surface of the stems, in combination with fulcrum-bearings in which the stems are mounted and fixed guides in which the spiral extensions play, whereby the scrapers are given a partial rotary motion and a simultaneous rocking motion to maintain the relative position of the meeting or overlapping edges of each pair, substantially as herein described.

16. In a fruit stoning machine, the inclined cutters or scrapers, in combination with the chutes I, in which they are mounted, the main frame carrying the chutes and having slots, and the bolts passing through the slots for securing the chutes to the frame, whereby their angle and that of the scrapers they carry may be varied, substantially as herein described.

17. In a fruit stoning machine, the inclined, yielding, and partially rotary cutters or scrapers upon which the fruit rests, in combination with the knives above for cutting the fruit and gripping its pit, said knives having inclined spring-controlled sliding shanks, the vertically-sliding spring-controlled spindles carrying the knife-shanks, and the treadle and connections with said shanks, whereby the knives are operated to force the pit down between the scrapers, substantially as herein described.

In witness whereof I have hereunto set my hand.

BENJAMIN A. LILLIE.

Witnesses:
S. H. NOURSE,
H. C. LEE.